United States Patent
Chew

(10) Patent No.: US 11,392,332 B2
(45) Date of Patent: Jul. 19, 2022

(54) NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

(71) Applicant: Brother Kogyo Kabushiki Kaisha, Nagoya (JP)

(72) Inventor: Po Chun Chew, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/238,531

(22) Filed: Apr. 23, 2021

(65) Prior Publication Data
US 2021/0334051 A1 Oct. 28, 2021

(30) Foreign Application Priority Data
Apr. 28, 2020 (JP) .............................. JP2020-079127

(51) Int. Cl.
*G06F 3/12* (2006.01)
*H04W 76/10* (2018.01)

(52) U.S. Cl.
CPC ............ *G06F 3/1225* (2013.01); *G06F 3/123* (2013.01); *G06F 3/1203* (2013.01); *G06F 3/1236* (2013.01); *G06F 3/1292* (2013.01); *H04W 76/10* (2018.02)

(58) Field of Classification Search
CPC ...... G06F 3/1225; G06F 3/1203; G06F 3/123; G06F 3/1236; G06F 3/1292; H04W 76/10; H04W 84/18
See application file for complete search history.

(56) References Cited

U.S. PATENT DOCUMENTS

| 2014/0094124 | A1* | 4/2014 | Dave ....................... | H04W 8/20 455/41.2 |
| 2019/0303079 | A1* | 10/2019 | Yamada ................ | G06F 3/1288 |
| 2021/0334047 | A1* | 10/2021 | Chew .................... | G06F 3/1285 |

FOREIGN PATENT DOCUMENTS

JP          2013-105361 A        5/2013

* cited by examiner

*Primary Examiner* — Juan M Guillermety
(74) *Attorney, Agent, or Firm* — Burr & Brown, PLLC

(57) ABSTRACT

A non-transitory storage medium stores a plurality of instructions readable by a computer of an information processing apparatus. The plurality of instructions cause the information processing apparatus to execute (a) adding processing of instructing an operating system of the information processing apparatus to add a particular device that communicates with the information processing apparatus, (b) when pairing by the operating system is completed after the adding processing, making-available processing of instructing the operating system to make wireless communication available based on a particular profile, and (c) after execution of the making-available processing, setup processing of setting up for executing wireless communication with the particular device by software based on the particular profile. The setup processing is not executed in a case where an availability of wireless communication is not stored in the storage so as to be associated with the particular device information.

8 Claims, 6 Drawing Sheets

FIG.3

BT DEVICE INFORMATION

DEVICE ID | ABC1234

BT ADDRESS | a0:66:10:96:08:49

⋮

BT SERVICE
 • SPP | AVAILABLE

FIG.4

BT DEVICE INFORMATION

DEVICE ID | ABC1234

BT ADDRESS | a0:66:10:96:08:49

⋮

BT SERVICE
 • SPP | <—>

FIG.5A 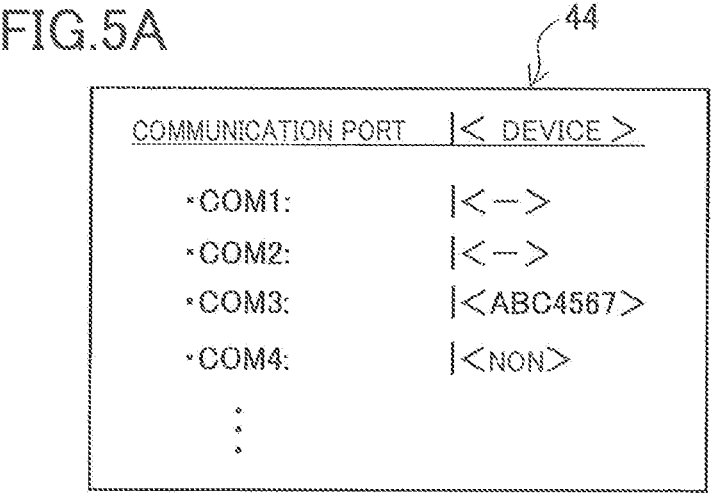 FIG.5B 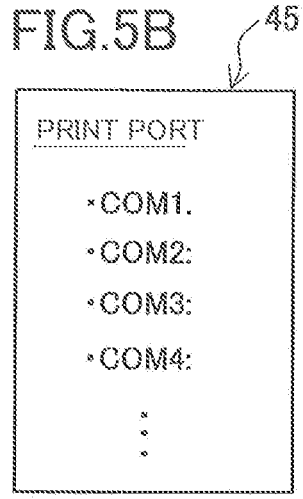

FIG.6
| PRINT QUEUE | PRINT PORT | PRINTER DRIVER | PRINT SETTING |
|---|---|---|---|
| QUEUE A | PRINT PORT A | DRIVER A | SETTING A |
| QUEUE B | PRINT PORT B | DRIVER B | SETTING B |
| | | | | though the pairing has succeeded.

NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

CROSS REFERENCE TO RELATED APPLICATION

The present application claims priority from Japanese Patent Application No. 2020-079127, which was filed on Apr. 28, 2020, the disclosure of which is herein incorporated by reference in its entirety.

BACKGROUND

A technical field disclosed in the specification relates to a technique of setting up software on an information processing apparatus.

There has been known a technique in which software necessary to communicate with a device is set up on an information processing apparatus to be connected to the device. For example, the conventional information processing apparatus has an installer for installing a printer driver on the information processing apparatus. The installer has a configuration in which setting information relating to a previously designated communication port is written in a registry as a database included in an operating system.

SUMMARY

For example, when setting up a device driver necessary for wireless communication with the device on the information processing apparatus, it is necessary to allocate the device to the communication port prepared in the operating system of the information processing apparatus after executing pairing with the device. However, there is a case where the device is not allocated to the communication port and the setup is not completed though the pairing has succeeded. The conventional information processing apparatus does not have a method for solving the above problem.

An aspect of the disclosure relates to a technique for increasing capability of completing the setup when setting up software necessary to communicate with the device in the information processing apparatus.

In one aspect of the disclosure, a non-transitory storage medium stores a plurality of instructions readable by a computer of an information processing apparatus. When executed by the computer, the plurality of instructions cause the information processing apparatus to execute (a) adding processing of instructing an operating system of the information processing apparatus to add a device that communicates with the information processing apparatus, the operating system executing pairing with respect to a particular device as a device to be added based on a prescribed wireless communication protocol and registering particular device information in a storage of the information processing apparatus in response to receipt of an instruction for adding the device, (b) when the pairing by the operating system is completed after the adding processing, making-available processing of instructing the operating system to make wireless communication available based on a particular profile as one of profiles to which the particular device is conformable in the prescribed wireless communication protocol, the operating system storing availability of wireless communication based on the particular profile into the storage so as to be associated with the particular device information in response to receipt of an instruction for making the wireless communication available based on the particular profile, and (c) after execution of the making-available processing, setup processing of setting up for executing wireless communication with the particular device by software of the information processing apparatus based on the particular profile, the setup processing being not executed in a case where the availability of wireless communication based on the particular profile is not stored in the storage so as to be associated with the particular device information registered in the operating system.

In another aspect of the disclosure, an information processing apparatus comprises a communication interface; and a computer. The computer executes: (a) adding processing of instructing an operating system of the information processing apparatus to add a device that communicates with the information processing apparatus, the operating system executing pairing with respect to a particular device as a device to be added based on a prescribed wireless communication protocol and registering particular device information in a storage of the information processing apparatus in response to receipt of an instruction for adding the device, (b) when the pairing by the operating system is completed after the adding processing, making-available processing of instructing the operating system to make wireless communication available based on a particular profile as one of profiles to which the particular device is conformable in the prescribed wireless communication protocol the operating system storing availability of wireless communication based on the particular profile into the storage so as to be associated with the particular device information in response to receipt of an instruction for making the wireless communication available based on the particular profile, and (c) after execution of the making-available processing, setup processing of setting up for executing wireless communication with the particular device by software of the information processing apparatus based on the particular profile, the setup processing being not executed in a case where the availability of wireless communication based on the particular profile is not stored in the storage so as to be associated with the particular device information registered in the operating system.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 3 is an explanatory view illustrating an example of device information stored in a BT device DB;

FIG. 4 is an explanatory view illustrating an example of device information stored in the BT device DB;

FIG. 5A is an explanatory view illustrating an example of communication ports;

FIG. 5B is an explanatory view illustrating an example of print ports;

FIG. 6 is an explanatory view illustrating an example of information stored in a print queue;

EMBODIMENTS

Hereinafter, an embodiment embodying a program will be explained in detail with reference to the attached drawings. The embodiment discloses the program executed in a personal computer (hereinafter referred to as "PC").

A PC 1 according to the embodiment is an apparatus connectable to a printer 2 as a device having a function of printing an image and capable of executing various application programs (hereinafter referred to as "applications") for allowing the printer 2 to execute functions of printing and the like. The PC 1 is an example of an information processing apparatus. For example, a smartphone or a tablet computer may be used instead of the PC 1.

The printer 2 is a device having at least the print function and a communication function. The printer 2 is an example of a particular device. The printer 2 according to the embodiment has at least an interface 21 (hereinafter referred to as "BT-IF") for executing communication by a communication protocol in Bluetooth (registered trademark, hereinafter referred to as "BT") as the communication function. The BT communication is a communication standard for 1-to-1 wireless connection. The BT communication is an example of a prescribed wireless communication protocol.

A plurality of communication profiles are prepared in the BT communication, and it is necessary that devices communicating with each other conform to the same communication profile for executing proper communication. The printer 2 according to the embodiment conforms to at least SPP (an abbreviation of Serial Port Profile) as the communication profile of the BT communication, and the printer 2 may conform also to other communication profiles such as HCRP (an abbreviation of Hardcopy Cable Replacement Profile). SPP is an example of a first profile and HCRP is an example of a second profile. The communication profile to which the printer 2 conforms is an example of a particular profile. The printer 2 may further have communication functions in communication mode other than the BT communication, for example, a communication function in a USB system.

Figure 1:
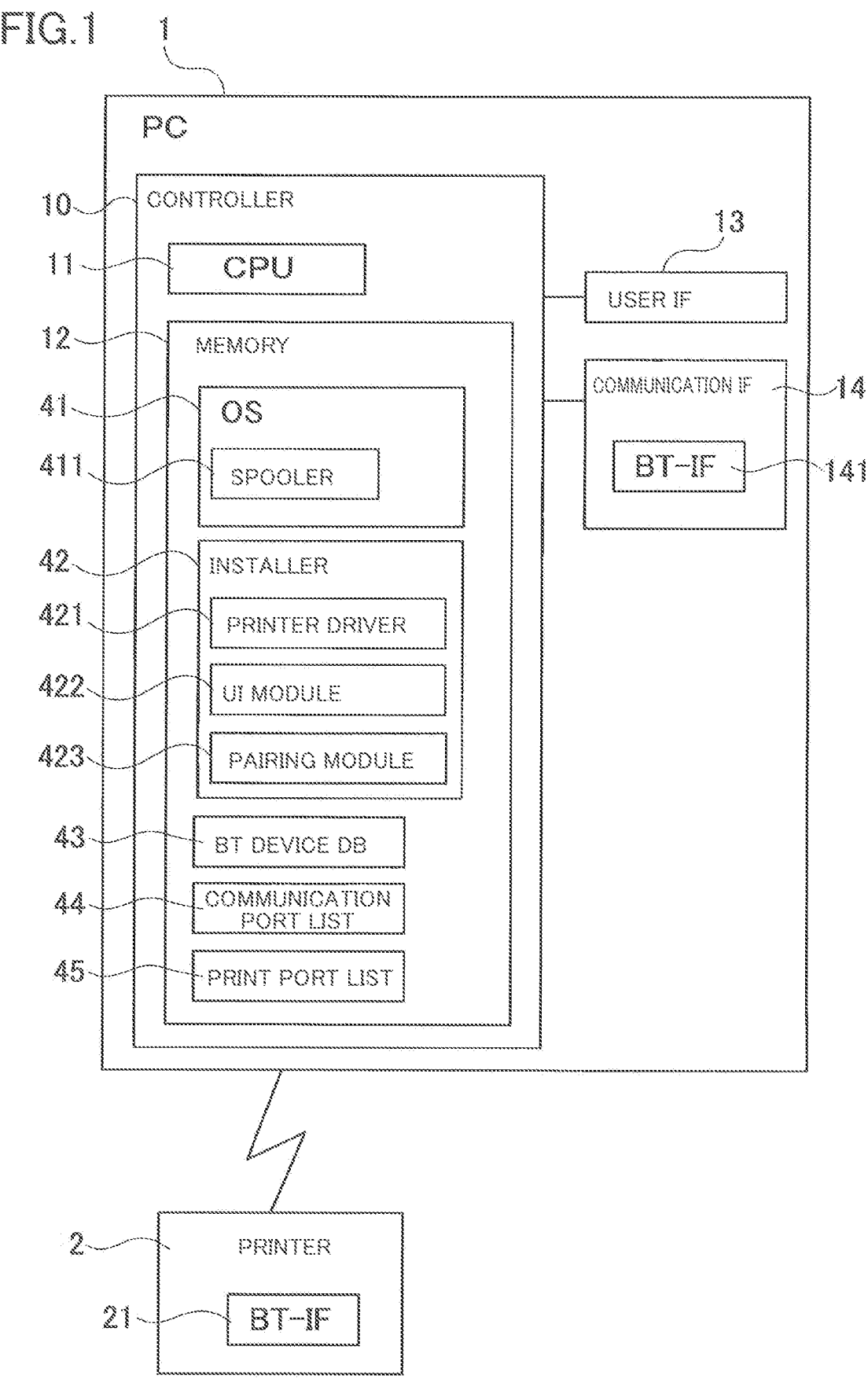
FIG. 1 is a schematic configuration diagram of a PC according to an embodiment.

The PC 1 according to the embodiment includes a controller 10 having a CPU 11 and a memory 12 as illustrated in FIG. 1. The CPU 11 is an example of a computer. The PC 1 also includes a user interface (hereinafter referred to as "user IF") 13 and a communication interface (hereinafter referred to as "communication IF") 14, and the user interface 13 and the communication interface 14 are electrically connected to the controller 10. The controller 10 in FIG. 1 is a general term used when hardware and software used for controlling the PC 1 or the like are collectively called, and the controller 10 does not always represent single hardware actually existing in the PC 1 or the like.

The CPU 11 executes various processing in accordance with programs read out from the memory 12 or based on operations by a user. The memory 12 is, for example, a ROM, a RAM, an HDD, or a flash memory, and the memory 12 is a storage area storing various programs such as a starting program for starting the PC 1, and various data such as image data, document data, and various setting information. The memory 12 is used also as a work area at the time of executing various processing. A buffer provided in the CPU 11 is also an example of the memory.

Examples of the memory 12 are not limited to the HDD and the like included in the PC 1 but may be storage media readable and writable by the CPU 11. The storage media readable by the computer are non-transitory media. The non-transitory media include recording media such as a CD-ROM and a DVD-ROM in addition to the above examples. The non-transitory media are also tangible media. On the other hand, an electrical signal configured to carry programs downloaded from a server or the like on Internet is a signal medium readable by the computer, and the signal medium is a kind of media readable by the computer; however, the signal medium is not included in the non-transitory storage media readable by the computer.

The user IF 13 includes hardware configured to display information on a screen and hardware configured to receive input operations by the user. The user IF 13 may be a combination of a display for executing display and a keyboard or a mouse, or may be a touch panel having a display function and an input receiving function.

The communication IF 14 includes hardware for communicating with external devices such as the printer 2. The PC 1 according to the embodiment includes at least a BT-IF 141 as the communication IF 14. The communication IF 14 may include IFs conforming to further other communication modes such as Ethernet (registered trademark), Wi-Fi (registered trademark), and USB. That is, the communication IF 14 may include IFs of wired system in addition to wireless systems.

In the memory 12 of the PC 1, an operating system (hereinafter referred to as "OS") 41, an installer 42, a BT device information database (hereinafter referred to as "BT device DB") 43, a communication port list 44, and a print port list 45 are incorporated as illustrated in FIG. 1. The OS 41 is, for example, Windows (registered trademark), mac OS (registered trademark), iOS (registered trademark), Android (registered trademark), or Linux (registered trademark). A spooler 411 is included in the OS 41. The spooler 411 manages transmission of print data to the device having the print function such as the printer 2.

The installer 42 includes a printer driver 421 applicable to a model of the printer 2, and the installer 42 is a program for incorporating the printer driver 421 in the PC 1. The installer 42 is an example of a plurality of instructions. The installer 42 according to the embodiment includes a UI module 422 configured to handle processing of receiving various selections by the user and a pairing module 423 configured to handle processing of allowing the OS 41 to execute the pairing. The UI module 422 is an example of a second module and the pairing module 423 is an example of a first module. FIG. 1 is a diagram illustrating a state before the setup of the printer 2 is completed. The printer driver 421 is incorporated in the memory 12 after the setup is completed. The installer 42 may be deleted after the setup is completed.

The printer driver 421 generates, for example, print data for making the printer 2 execute printing in cooperation with the OS 41. The printer driver 421 is an example of a device driver, and an example of software. The installer 42 may include not only the printer driver 421 for the model of the printer 2 but also a printer driver or a scanner driver for another model.

The BT device DB 43 stores device information of respective BT devices registered in the OS 41 as devices used by using the BT communication. In the BT device DB 43, for example, information including a device ID as information for identifying the device and a BT address as address information used for the BT communication is stored as device information.

The communication port list 44 is a list in which a plurality of communication ports used by the PC 1 for communicating with an external device by using the communication IF 14 are set. The print port list 45 is a list of communication ports used for allowing the device having the print function such as the printer 2 to execute printing.

The information of the DB such as the BT device DB 43, the communication port list 44 and the print port list 45 is stored in a non-transitory memory such as the HDD. The installer 42 uses the information by reading the information to the RAM from the HDD or the like when using the information. In the following description, registration to the DB and the lists by the OS 41 and the installer 42 means an update of information of the HDD and the like. The updated information is referred to by the OS 41, the spooler 411, and various applications.

Next, an outline of a procedure of installing the printer driver 421 by the installer 42 according to the embodiment and executing the setup for instructing the printer 2 to execute printing by the printer driver 421 will be explained with reference to a sequence diagram of FIG. 2. The installer 42 allows the user to select a model name of the printer 2 and a type of the communication IF used for connection between the printer 2 and the PC 1 (A1). The installer 42 installs the printer driver 421 conforming to the selected model name on the PC 1 (A2). Explanation will be made on the assumption that the BT communication has been selected as the type of the communication IF in the following description.

The installer 42 makes the OS 41 execute pairing of the PC 1 and the printer 2. Specifically, the installer 42 instructs the user, for example, to make both the BT-IF 141 of the PC 1 and the BT-IF 21 of the printer 2 function and make both the BT-IF 141 and the BT-IF 21 close to each other to a distance in which BT communication can be executed, and instructs the OS 41 to add the device (A3).

The OS 41 detects the device by using the BT-IF 141 when receiving the instruction for adding the device (A4). The OS 41 allows the BT-IF 141, for example, to transmit a search signal. Each device existing within a distance range in which BT communication can be executed with respect to the PC 1 and receiving the search signal sends information including the device ID as information for identifying the device and the BT address as address information used for the BT communication to the OS 41 in response to receipt of the search signal (A5). The OS 41 causes the user IF 13 to display a device selection screen including a list of additional candidate devices which have responded to the instruction (A6) and determines the device to be added based on selection by the user (A7). The OS 41 may detect the device by detecting beacons emitted from respective devices.

The OS 41 further communicates with the printer 2 when determining the printer 2 as the device to be added and executes the pairing (A8). The installer 42 passes an instruction for making the communication profile to which the printer 2 conforms to the OS 41 available (A9). The installer 42 determines that the processing of pairing by the OS 41 has been completed, for example, when the device selection screen displayed by the OS 41 is closed. The communication profile will be described later.

Then, the OS 41 registers the printer 2, the pairing with which has been completed, in the communication port list 44 (A10). The installer 42 obtains port names of respective communication ports registered in the communication port list 44 from the OS 41 (A11) and displays the port names in a list (A12). The installer 42 receives selection of the communication port through the user IF 13 (A13).

The installer 42 further instructs the OS 41 to create a print queue corresponding to the printer 2 so as to be associated with the selected communication port and to register the printer driver 421 so as to be associated with the created print queue (A14). The print queue is an example of a device queue. The OS 41 creates the print queue corresponding to the selected communication port based on the instruction, and registers the printer driver 421 so as to be associated with the created print queue (A15).

In the installer 42 according to the embodiment, for example, A1 to A2, A12 to A14 are executed by the UI module 422, and A3 to A11 are executed by the pairing module 423. The UI module 422 starts the pairing module 423 after the install at A2 is completed, and the UI module 422 passes information received at A1 to the pairing module 423. These processing may be executed as one program, not by separate modules; however, processing relating to the pairing is executed by one module, and processing relating to the install of the printer driver 421 and the setup is executed by separate modules, thereby facilitating design and maintenance of respective processing.

The OS 41 obtains information of the communication profile to which the printer 2 conforms from the printer 2 at the time of executing pairing at A8, and the OS 41 registers the information in the BT device DB 43 as device information. For example, when information of SPP can be obtained as information of the communication profile, the OS 41 sets SPP to be available. When information of another communication profile can be further obtained from the printer 2, the OS 41 also sets the communication profile to be available. When the pairing succeeds, the device ID and the BT address of the printer 2 and the type of the available communication profile are registered in the BT device DB 43 as device information of the printer 2, for example, as illustrated in FIG. 3. Note that "BT service" in FIG. 3 indicates information of the available communication profile.

Then, the OS 41 determines the communication port to be used in accordance with the available communication profile and registers the communication port in the communication port list 44. For example. the OS 41 allocates a COM port as a serial port to the device in which SPP has become available, and allocates a communication port for HCRP to the device in which HCRP has become available.

In order to allow the pairing to succeed, the OS 41 is required to receive information of the available communication profile from the printer 2. However, it may take time for receiving information of the communication profile due to compatibility or the like between the BT-IF 141 of the PC 1 and the BT-IF 21 of the printer 2. In that case, the OS 41 in which a time-out period until the completion of pairing is set may end the pairing due to time-out without making the communication profile available, which is originally available. When the pairing is ended due to time-out, it is possible that device information not including information of the communication profile is registered in the BT device DB 43 as information of the printer 2, for example, as illustrated in FIG. 4.

Figure 2:
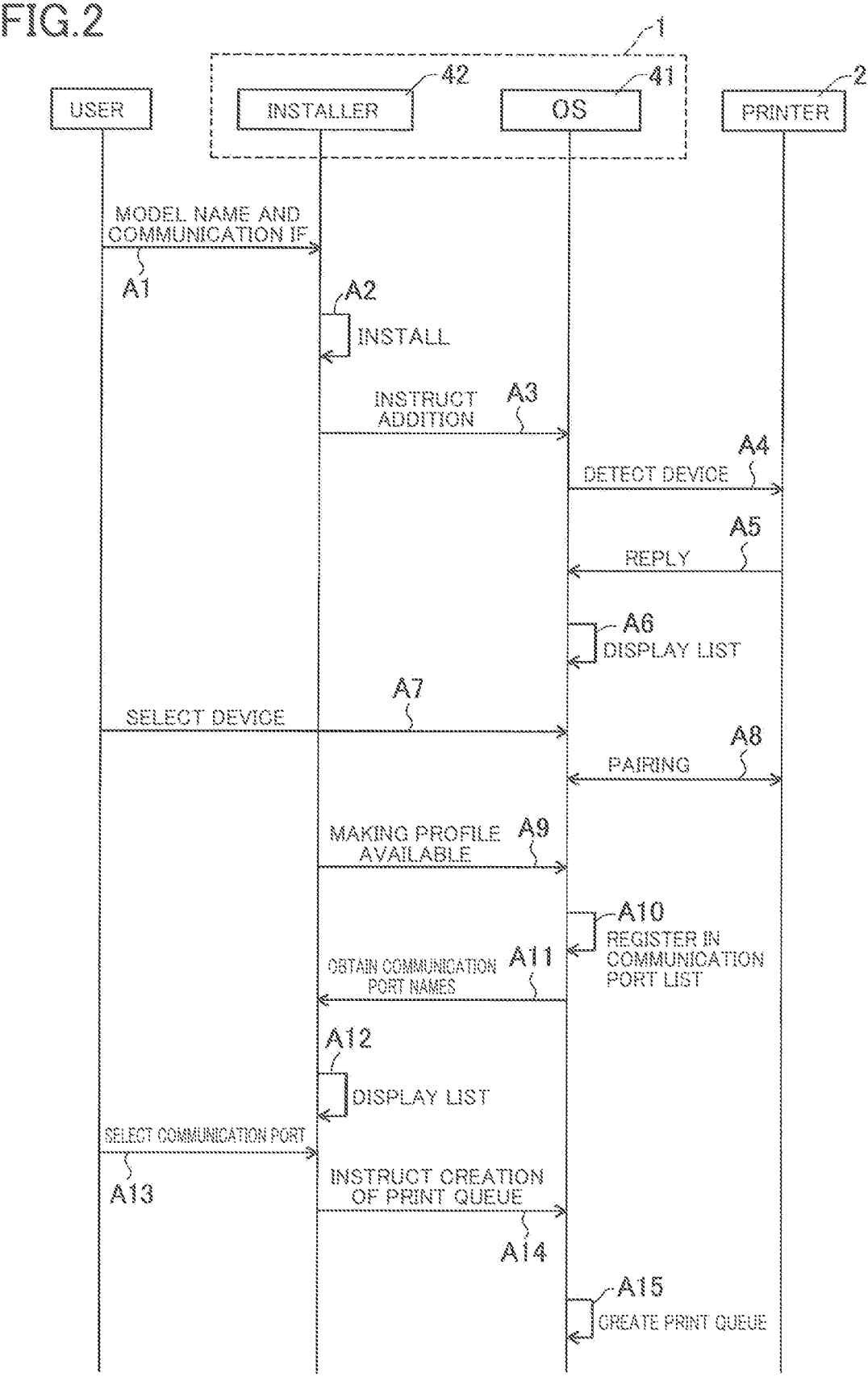
FIG. 2 is a sequence diagram illustrating an outline of an installer procedure.

At A9 of FIG. 2, the installer 42 according to the embodiment passes, to the OS 41, an instruction for making the communication profile to which the printer in the model name designated at A1 is conformable available. The OS 41 rewrites information of available communication profile in device information of the printer 2 stored in the BT device DB 43. Accordingly, at least one communication profile becomes available as illustrated in FIG. 3 in the device information of the printer 2 even when the information is in the state of FIG. 4 at the time of ending the pairing. Since the printer 2 according to the embodiment conforms to at least SPP, the OS 41 allocates at least one of COM ports as the communication port used for communicating with the printer 2.

In the OS 41 according to the embodiment, a plurality of COM ports are prepared in advance as illustrated in FIG. 5A, and the plurality of COM ports are registered in the communication port list 44, for example, as a COM1 port, a COM2 port and the like.

Moreover, in the OS 41 according to the embodiment, a plurality of print ports having the same names respectively corresponding to the plurality of COM ports are provided in advance, for example, as illustrated in FIG. 5B, and the plurality of print ports are registered in the print port list 45. The plurality of print ports are communication ports recognizable by the spooler 411, and the print port list 45 is a list of the plurality of print ports. Each of the plurality of print ports is preferably associated with a corresponding one of the plurality of communication ports and correspondence therebetween is not limited to one according to the name. For example, when identification numbers are given to respective communication ports, each of the plurality of print ports may be associated according to a corresponding one of the identification numbers.

For example, four ports which are the COM1 port to a COM4 port are registered in the example of FIG. 5A. Among them, the COM1 port and the COM2 port are reserved by the OS 41 to be used by the OS 41. The OS 41 reserves these ports for communicating with a device mounted on a serial IF or a USB-IF. On the other hand, the COM3 port and the COM4 port are not reserved by the OS 41, and the COM3 port and the COM4 port are not associated with any device in an initial state of the PC 1. The OS 41, after executing the pairing with the BT device, associates the device with one of ports neither reserved nor associated.

Figure 5C:
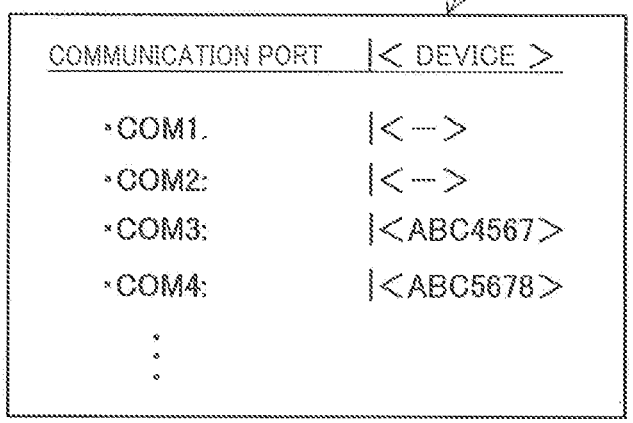
FIG. 5C is an explanatory view illustrating an example of communication ports.

For example, a device "ABC4567" is registered while being associated with the COM3 port and any device is not associated with the COM4 port in a state of FIG. 5A. When pairing with another device "ABC5678" is executed in this state, the added device "ABC5678" is registered in the BT device DB 43 while being associated with the COM4 port as illustrated in FIG. 5C.

The device in which the communication profile becomes available and registered in the BT device DB 43 is associated with the communication port by the communication port list 44. When the communication port with which the device is associated is registered also in the print port list 45 and the communication port is associated with the print queue, the application installed in the PC 1 is capable of instructing printing by designating the print queue. For example, information such as the print port, the printer driver, and print setting is stored so as to be associated with the print queue as illustrated in FIG. 6. The printer driver associated with the print queue instructed to execute printing allows the device associated with the communication port to execute printing through the communication port associated with the print queue.

Specifically, the application instructs the OS 41 to execute printing by designating the print queue and passing image data to the OS 41. The OS 41 instructed to execute printing starts the printer driver 421 associated with the print queue and passes the image data to be printed to the printer driver 421. The printer driver 421 generates print data corresponding to the printer 2 based on the image data received from the OS 41 and passes the generated print data to the OS 41. The OS 41 passes the received print data to the print queue.

The spooler 411 transmits the print data to the printer 2 through the print port associated with the print queue, namely, through the communication IF with which the print port is associated. Accordingly, printed matter obtained based on the image data is created by the printer 2.

However, when the pairing is ended while the communication profile does not become available, since the OS 41 is not capable of determining the communication port with which the new device is associated as described above, the OS 41 does not register the communication port in the communication port list 44. In the example of FIGS. 5A to 5C, when SPP of "ABC5678" does not become available, the communication port list 44 does not become in the state of FIG. 5C and remains in the state of FIG. 5A. Naturally, the print port list 45 is not updated, therefore, the installer 42 is not capable of associating the print queue with the print port. That is, when the pairing is ended due to time-out, there is a problem that the installer 42 is not capable of completing the setup by designating the communication port used for communicating with the printer 2.

Next, a procedure of the setup by the installer 42 will be explained with reference to a flowchart. The following processing and respective processing steps of the flowchart basically indicate processing of the CPU 11 following commands described in programs. That is, processing such as "to decide", "to extract", "to select", "to calculate", "to determine", "to specify", "to obtain", "to receive", and "to control" in the following explanation indicates processing of the CPU 11. The processing by the CPU 11 also includes hardware control using an API of the OS in the PC 1. In the specification, the description of the OS is omitted and operations of respective programs will be explained. That is, a description saying that "a program B controls hardware C" may indicate that "the program B controls hardware C by using the API of the OS" in the following explanation. Moreover, processing of the CPU 11 following commands described in the program is described in simplified wording in some cases. For example, the description will be made such as "the CPU 11 executes . . . ". Furthermore, processing of the CPU 11 following commands described in the program is described in wording in which the CPU is omitted such as "the program A executes . . . " in some cases.

Note that "to obtain" will be used in a concept that the request is not essential. That is, processing of receiving data without being requested by the CPU 11 is also included in a concept that "the CPU 11 obtains data". "Data" in the specification is represented by a bit string readable by the computer. Then, data having substantially the same contents in a different format will be dealt with as the identical data. The same applies to "information" in the specification. Moreover, "to request" and "to instruct" are concepts that information indicating the request and information indicating the instruction are outputted to the other party. The information indicating the request and the information indicating instruction may be written merely as "request" and "instruction".

Furthermore, processing of determining whether information A indicates that it is a matter B by the CPU 11 may be conceptually described such as "whether it is the matter B or not is determined from the information A". Processing of determining whether information A indicates that it is a matter B or a matter C may be conceptually described such as "whether it is the matter B or the matter C is determined from the information A".

Figure 7:
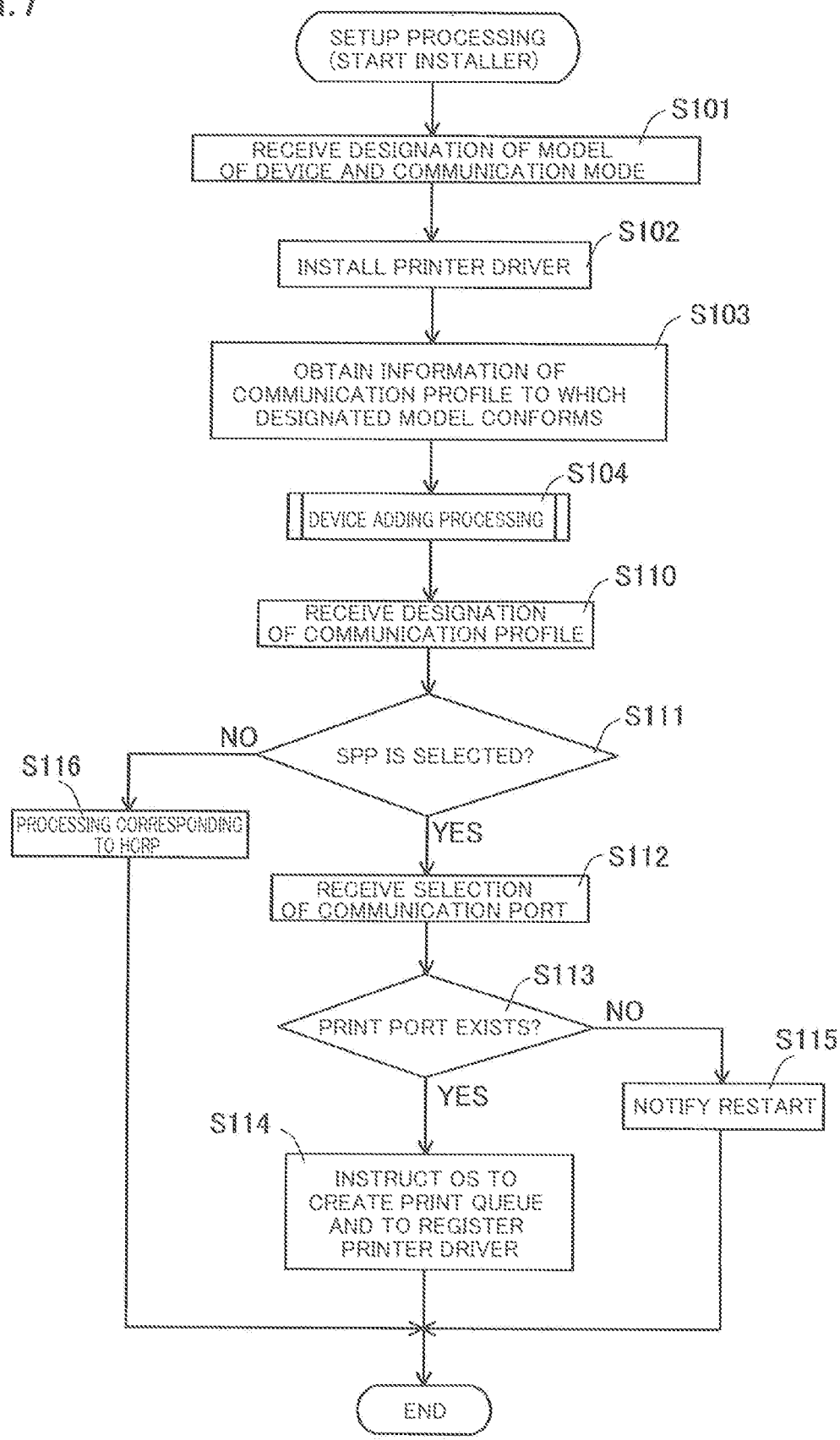
FIG. 7 is a flowchart illustrating a procedure of setup processing.

Hereinafter, the procedure of setup processing will be explained with reference to a flowchart of FIG. 7. The setup processing is executed in the CPU 11 of the PC 1 when the installer 42 is started up in the PC 1. The installer 42 first starts the UI module 422. That is, respective processing in the flowchart illustrated in FIG. 7 is executed as processing of the UI module 422.

In the setup processing, the CPU 11 receives designation of model information of the device to be set up and the communication mode by a user's operation (S101, A1 of FIG. 2). S101 is an example of obtaining processing and an example of selection processing. When the printer 2 conforms to not only the BT communication but also communication in other modes such as USB communication, the user can select a connection mode used for communicating with the printer 2 from these communication modes. The case in which designation of model information conforming to the model of the printer 2 and designation of the BT communication are received at S101 will be explained in the following description.

The CPU 11 determines the printer driver 421 as a target to be installed based on information designated at S101 and installs the printer driver 421 (S102, A2 of FIG. 2). The installer 42 includes, for example, the printer drivers respectively conforming to a plurality of models in the same series, and printer drivers respectively conforming to a plurality of types of communication modes, and the installer 42 determines the printer driver to be installed from the plurality of printer drivers. When only one type of printer driver is included in the installer 42, S101 may be skipped. If the printer driver 421 to be installed has been installed in the PC 1, the CPU 11 may skip S102.

The CPU 11 obtains information of the communication profile to which the printer of the model designated at S101 conforms (S103). For example, the installer 42 has information of the communication profiles to which respective models conform. Then, the CPU 11 executes device adding processing for executing setting relating to the BT communication with the printer 2 (S104). The UI module 422 starts the pairing module 423 at S104, and passes, to the pairing module 423, model information of the printer 2 and information of the communication profile to which the printer 2 is conformable. Then, the pairing module 423 executes the device adding processing.

Figure 8:
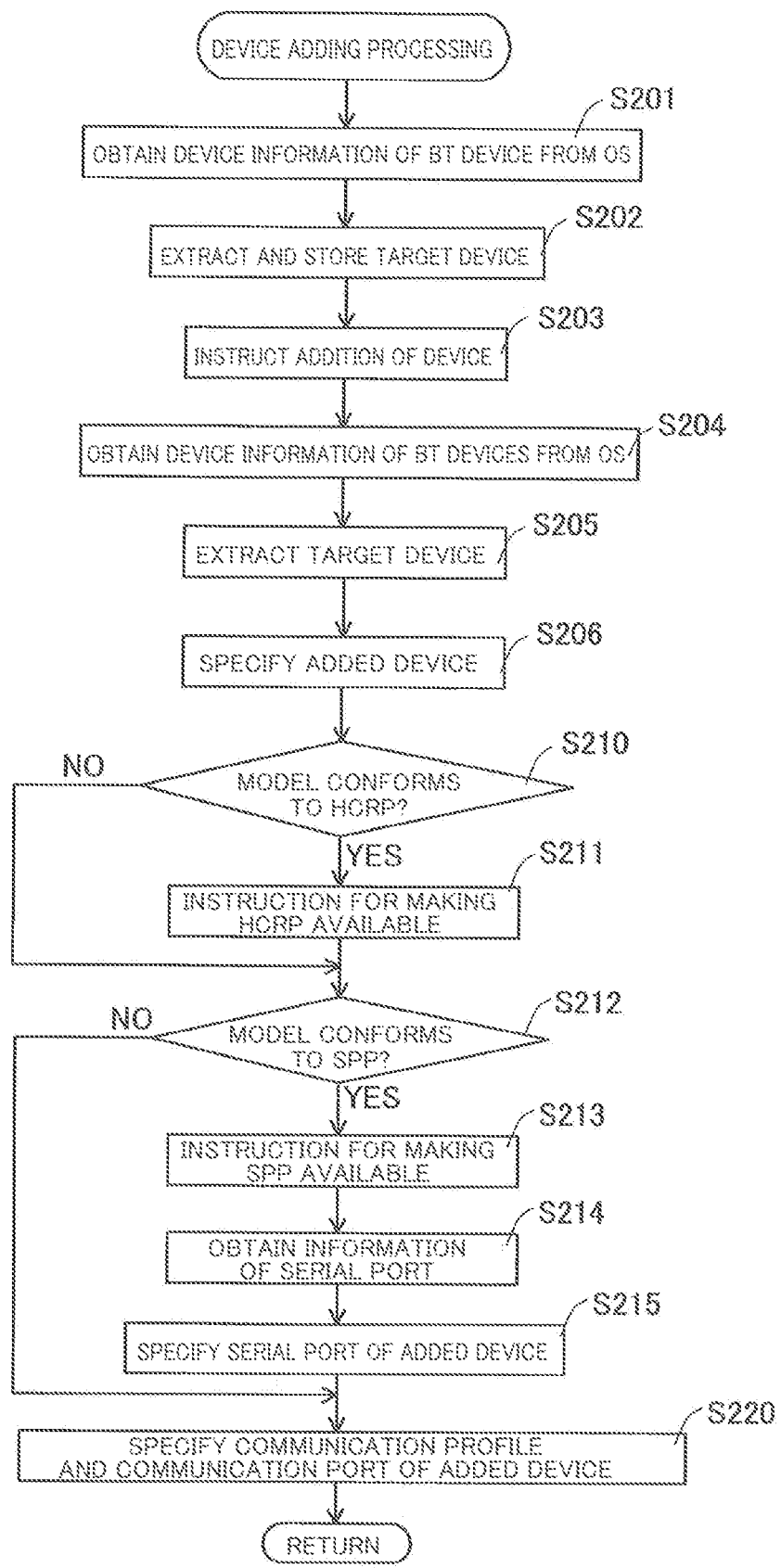
FIG. 8 is a flowchart illustrating a procedure of device adding processing.

The device adding processing is processing in which pairing with respect to the device is executed and information of the device is registered in the BT device DB 43. A procedure of the device adding processing will be explained with reference to a flowchart of FIG. 8. In the device adding processing, the CPU 11 obtains device information of the BT devices which have been registered in the BT device DB 43 from the OS 41 (S201). Specifically, the CPU 11 passes a command for requesting device information of the BT devices to the OS 41 and receives, from the OS 41, information of device IDs and BT addresses of the BT devices which have been registered in the BT device DB 43.

The CPU 11 extracts a target device to be set up by the installer 42 from the received device information and temporarily stores information of the extracted device into the memory 12 (S202). For example, in a case where a printer in the same series as the printer 2 to be set up this time has been already registered in the PC 1, information of the printer is included in the BT device DB 43.

The CPU 11 instructs the OS 41 to add the device (S203, A3 of FIG. 2). S203 is an example of adding processing. The OS 41 displays, for example, a list of devices (S6 of FIG. 2) based on a search result by the BT communication (A4 and A5 of FIG. 2), and the OS 41 receives selection of the user (A7 of FIG. 2) and executes pairing with the printer 2 (A8 of FIG. 2) as described above.

After the processing of pairing by the OS 41 is ended, the CPU 11 obtains device information of the BT devices registered in the BT device DB 43 from the OS 41 again (S204). S204 is the same processing as S201. The CPU 11 extracts device information of the target device from the received device information in the same manner as S202 (S205). Since the pairing has been executed by the instruction for addition at S203, device information extracted at S205 contains information of more devices than device information stored at S202.

Then, the CPU 11 specifies the added device (S206). Since the printer 2 is added in the embodiment, the CPU 11 obtains the device ID and the BT address of the printer 2 at S206. The CPU 11 may delete information of the device stored at S202 when specification of the added device succeeds. In the case where there is no added device, the CPU 11 may allow the user IF 13 to display a message for executing pairing again.

The CPU 11 determines whether the printer 2 conforms to HCRP or not based on model information passed from the UI module 422 (S210). When it is determined that the printer 2 conforms to HCRP (S210: YES), the CPU 11 passes, to the OS 41, an instruction for making HCRP available as the communication profile for device information of the printer 2 (S211, A9 of FIG. 2). S211 is an example of making-available processing. When receiving the instruction for making HCRP available, the OS 41 updates device information of the printer 2 registered in the BT device DB 43, and further, the OS 41 sets a print port for HCRP so as to be associated with the printer 2. When HCRP is made available, PnP (an abbreviation of Plug and Play) is generated, and the OS 41 allocates the print port for HCRP to that device.

After S211, or when it is determined that the printer 2 does not conform to HCRP (S210: NO), the CPU 11 determines whether the printer 2 conforms to SPP or not (S212). When it is determined that the printer 2 conforms to SPP (S212: YES), the CPU 11 passes, to the OS 41, an instruction for making SPP available as the communication profile for device information of the printer 2 (S213, A9 of FIG. 2). S213 is an example of making-available processing. When the OS 41 receives the instruction for making SPP available, the OS 41 updates device information of the printer 2 registered in the BT device DB 43 and allocates a serial port to the BT address of the printer 2.

The OS 41 according to the embodiment does not have a function of returning information of the communication profile registered as device information. That is, the CPU 11 is not capable of executing processing of S211 or S213 according to a result obtained by checking whether the communication profile is available or unavailable. On the other hand, the OS 41 merely overwrites device information and information of communication ports which have been set even when receiving the instruction for further making the communication profile, which has been already made available, available. That is, the communication port which has been already set is not changed. In a case where the OS having the function of returning information of the communication profile which has been made available, or the function of returning information indicating whether the designated communication profile is available or unavailable is used, the CPU 11 may determine whether S211 or S213 is executed or not by using these functions.

Since the printer 2 according to the embodiment conforms to at least SPP, the CPU 11 determines YES at S212 and makes SPP available. When all models as targets of the installer 42 according to the embodiment conform to SPP, the determination at S212 can be omitted. Specifically, the CPU 11 preferably proceeds to S213 after S211 or after the CPU 11 determines NO at S210. The CPU 11 makes HCRP available when the printer 2 conforms also to HCRP in the embodiment, therefore, there is a wide range of selection for the user relating to the communication profile. On the other hand, the CPU 11 does not make HCRP available when the printer 2 does not conform to HCRP, which can omit unnecessary processing.

The PC 1 is able to execute communication with the printer 2 by directly designating the BT address, without designating the communication port. However, there is a limit in size of data capable of being transmitted through communication by the BT address. The data size capable of being transmitted is increased by setting the communication port, which enables transmission of print data.

The CPU 11 obtains information of the registered serial port and information of the BT address associated with the port from the OS 41 after making SPP available (S214). The information obtained at S214 contains information of the COM port set by the OS 41 in accordance with the instruction at S213, namely, information of the COM port associated with the printer 2. The CPU 11 specifies the COM port with which the BT address of the printer 2 as the added device is associated based on the obtained information (S215), and the CPU 11 registers information of the specified COM port in the BT device DB 43 so as to be associated with the device ID as the communication port used by the printer 2.

The CPU 11 specifies information of the communication profiles which has been made available and information of the communication ports used for respective communication profiles (S220), ending the device adding processing and returning to the setup processing. That is, the pairing module 423 passes information of the communication profiles and information of the communication ports to the UI module 422 and ends the processing. The installer 42 may execute pairing of a plurality of devices in succession. In that case, processing of the pairing module 423 may be repeated for the number of times corresponding to the number of devices.

Explanation is returned to the setup processing of FIG. 7. After the device adding processing at S104, the CPU 11 receives designation of the communication profile to be used among the communication profiles received from the pairing module 423 by a user's operation (S110). The CPU 11 may also receive designation of the communication profile at S101.

The CPU 11 determines whether SPP has been selected or not (S111). When the communication profile to which the printer 2 is conformable is only SPP, it is not necessary to receive the user's operation at S110, and the CPU 11 just determines to use SPP as the communication profile.

When it is determined that SPP has been selected (S111: YES), the CPU 11 receives selection of the communication port associated with the printer 2 by a user's operation (S112, A13 of FIG. 2). The CPU 11 causes the user IF 13 to display the list of serial ports to which devices are set, for example, in a mode in which the communication port specified at S220 of the device adding processing is easily selected (A12 of FIG. 2), and the CPU 11 receives the user's selection. The CPU 11 may preferably display the communication port with which the device is newly associated by the pairing this time in display states such as displaying at the top, displaying with emphasis, and displaying only the communication port. The CPU 11 may determine to use the communication port specified at S220 of the device adding processing without receiving the user's operation.

Then, the CPU 11 determines whether there is a print port corresponding to the selected communication port or not (S113). S113 is an example of determination processing. The print port is an example of a particular port.

When the OS 41 is instructed to add further another device after all COM ports prepared in advance are associated with devices, there is a case where the OS 41 adds the COM port, registers the port in the communication port list 44 and associates the device with the added COM port. Moreover, there is a case where the COM port added to the communication port list 44 is not reflected on the print port list 45 immediately. In this case, there is a possibility that a corresponding print port does not exist when the selected communication port is the added COM port.

When it is determined that the print port exists (S113: YES), the CPU 11 instructs the OS 41 to create a print queue corresponding to the print port and to resister the installed printer driver 421 so as to be associated with the created print queue (S114, A14 of FIG. 2). S114 is an example of setup processing. Accordingly, the print queue for BT communication based on SPP is created (A15 of FIG. 2), and the printer driver 421 is associated with the print port through the print queue, which enables communication between the printer driver 421 and the printer 2.

When it is determined that the print port does not exist (S113: NO), the CPU 11 makes notification for prompting restart of the OS 41 (S115). When the OS 41 or the spooler 411 is restarted after the serial port is added, the spooler 411 reconfigures the print port list 45 based on the communication port list 44 at the time of restarting. Then, the print port corresponding to the added communication port is provided in the print port list 45, therefore, the creation of the print queue and the registration of the printer driver 421 can be executed. The possibility of completing the setup is increased by notifying the restart.

On the other hand, when it is determined that HCRP has been selected as the communication profile (S111: NO), the CPU 11 executes processing corresponding to HCRP (S116). In the case of HCRP, most of processing for setting the communication port is executed by the OS 41. The CPU 11 ends the setup processing after S114 or S116.

As described above in detail, the installer 42 according to the embodiment makes the communication profile to which the printer 2 conforms available in the BT communication when the pairing by the BT communication succeeds. Even when the OS 41 does not make the communication profile available due to a failure of a driver for BT communication or the like, the installer 42 makes the communication profile available, therefore, the possibility that the setup for executing wireless communication between the printer driver 421 and the printer 2 by the BT communication can be completed is increased.

Moreover, the installer 42 according to the embodiment obtains model information of the printer 2 and makes the communication profile to which the printer 2 conforms available based on the model information, therefore, an unconformable communication profile is not made available and unnecessary processing can be saved.

The embodiment is merely an example, and does not limit the present invention at all. Therefore, various modifications and alterations may naturally occur in the technique disclosed in the specification within a scope not departing from the gist thereof. For example, the device is not limited to the printer as long as the device communicates with the PC 1 by using programs such as the printer driver 421, and the device may be a multifunction device, a FAX machine, or a scanner. Additionally, the numbers of PCs and devices are not limited to illustrated examples.

Although the BT communication and the communication profile therefor have been explained in the embodiment, the communication standard is not limited to the BT communication as long as it is a communication standard requiring the pairing by the OS 41. The communication profile to be made available is not limited to SPP and HCRP, and all communication profiles to which the printer 2 is conformable can be made available. On the other hand, only SPP may be made available even when the printer 2 is capable of conforming to a plurality of communication profiles. The printer driver 421 can transmit print data to the printer 2 by making at least SPP available.

The installer 42 has information of communication profiles to which the devices are conformable so as to be associated with respective model information in the embodiment; however, the information is not limited to this. The installer 42 may obtain necessary information, for example, from a file or a server having information of communication profiles.

In arbitrary flowcharts disclosed in embodiments, a plurality of processing in a plurality of arbitrary steps may be arbitrarily changed in the execution order or may be executed in parallel in a range not causing discrepancy in the processing contents.

The processing disclosed in embodiments may be executed by a single CPU, a plurality of CPUs, hardware such as ASIC or combinations of them. The processing disclosed in the embodiments may be realized in various states such as a recording medium recording programs or methods for executing the processing.

What is claimed is:

1. A non-transitory storage medium storing a plurality of instructions readable by a computer of an information processing apparatus,
    wherein, when executed by the computer, the plurality of instructions cause the information processing apparatus to execute:
        adding processing of instructing an operating system of the information processing apparatus to add a device that communicates with the information processing apparatus, the operating system executing pairing with respect to a particular device as a device to be added based on a prescribed wireless communication protocol and registering particular device information in a storage of the information processing apparatus in response to receipt of an instruction for adding the device,
        when the pairing by the operating system is completed after the adding processing, making-available processing of instructing the operating system to make wireless communication available based on a particular profile as one of profiles to which the particular device is conformable in the prescribed wireless communication protocol, the operating system storing availability of wireless communication based on the particular profile into the storage so as to be associated with the particular device information in response to receipt of an instruction for making the wireless communication available based on the particular profile, and
        after execution of the making-available processing, setup processing of setting up for executing wireless communication with the particular device by software of the information processing apparatus based on the particular profile, the setup processing being not executed in a case where the availability of wireless communication based on the particular profile is not stored in the storage so as to be associated with the particular device information registered in the operating system.

2. The non-transitory storage medium according to claim 1,
    wherein the setup processing is processing of creating a device queue for executing wireless communication with the particular device by the software based on the particular profile,
    wherein the created device queue is managed by a spooler of the operating system, and
    wherein the software is a device driver used for communicating with the particular device.

3. The non-transitory storage medium according to claim 2,
    wherein, when executed by the computer, the plurality of instructions cause a first module of the information processing apparatus to execute the adding processing and the making-available processing, and the plurality of instructions cause a second module, which is different from the first module, of the information processing apparatus to execute the setup processing.

4. The non-transitory storage medium according to claim 1,
    wherein, when executed by the computer, the plurality of instructions cause the information processing apparatus to execute:
        determination processing of determining whether there exists a particular port associated with the particular device of a plurality of communication ports, the plurality of communication ports for communicating with a plurality of devices through a communication interface of the information processing apparatus being set in the operating system, the plurality of communication ports being capable of being associated with the plurality of devices respectively, the operating system associating one of the set communication ports with the particular device when wireless communication based on the particular profile is available, and
        when it is determined that there exists the particular port in the determination processing, the setup processing after execution of the making-available processing, the setup processing being not executed when it is determined that there is no particular port in the determination processing.

5. The non-transitory storage medium according to claim 4,
    wherein the setup processing is executed after the software is installed on the information processing apparatus, the software executing processing of creating the device queue for communicating with the particular device, the created device queue being associated with the communication port associated with the particular device managed by the spooler of the operating system, and
    wherein the software is a device driver used for communicating with the particular device.

6. The non-transitory storage medium according to claim 1,
    wherein, when executed by the computer, the plurality of instructions cause the information processing apparatus to execute obtaining processing of obtaining a model of the particular device, and wherein, after the adding processing and the pairing by the operating system is completed, when executed by the computer, the plurality of instructions cause the information processing apparatus to execute the making-available processing in a case where the model obtained in the obtaining processing conforms to the particular profile, the making-available processing being not executed in a case where the model obtained in the obtaining processing does not conform to the particular profile.

7. The non-transitory storage medium according to claim 1,
wherein, when executed by the computer, the plurality of instructions cause the information processing apparatus to execute:
selection processing of selecting a connection mode for communicating with the particular device through a user interface of the information processing apparatus, and
the adding processing in response to selection of the prescribed wireless communication protocol in the selection processing, the prescribed wireless communication protocol being a connection mode of 1-to-1 wireless connection.

8. An information processing apparatus comprising:
a communication interface; and
a computer,
wherein the computer executes:
adding processing of instructing an operating system of the information processing apparatus to add a device that communicates with the information processing apparatus, the operating system executing pairing with respect to a particular device as a device to be added based on a prescribed wireless communication protocol and registering particular device information in a storage of the information processing apparatus in response to receipt of an instruction for adding the device,
when the pairing by the operating system is completed after the adding processing, making-available processing of instructing the operating system to make wireless communication available based on a particular profile as one of profiles to which the particular device is conformable in the prescribed wireless communication protocol the operating system storing availability of wireless communication based on the particular profile into the storage so as to be associated with the particular device information in response to receipt of an instruction for making the wireless communication available based on the particular profile, and
after execution of the making-available processing, setup processing of setting up for executing wireless communication with the particular device by software of the information processing apparatus based on the particular profile, the setup processing being not executed in a case where the availability of wireless communication based on the particular profile is not stored in the storage so as to be associated with the particular device information registered in the operating system.

* * * * *